(12) United States Patent
Nguyen

(10) Patent No.: US 7,036,090 B1
(45) Date of Patent: *Apr. 25, 2006

(54) CONCENTRIC POLYGONAL MENUS FOR A GRAPHICAL USER INTERFACE

(75) Inventor: Loc V. Nguyen, Issaquah, WA (US)

(73) Assignee: Digeo, Inc., Kirkland, WA (US)

( * ) Notice: Subject to any disclaimer, the term of this patent is extended or adjusted under 35 U.S.C. 154(b) by 602 days.

This patent is subject to a terminal disclaimer.

(21) Appl. No.: 10/092,008

(22) Filed: Mar. 6, 2002

Related U.S. Application Data

(63) Continuation-in-part of application No. 29/148,625, filed on Sep. 24, 2001, now Pat. No. Des. 474,197.

(60) Provisional application No. 60/329,981.

(51) Int. Cl.
    *G06F 3/00* (2006.01)

(52) U.S. Cl. ........................... 715/834; 715/810

(58) Field of Classification Search ............... 715/810, 715/848, 850, 834; 725/37, 44, 61
    See application file for complete search history.

(56) References Cited

U.S. PATENT DOCUMENTS

| | | | | |
|---|---|---|---|---|
| 5,485,197 A * | 1/1996 | Hoarty | ........................ | 725/37 |
| 5,798,760 A * | 8/1998 | Vayda et al. | ................. | 715/834 |
| 5,940,076 A * | 8/1999 | Sommers et al. | ........... | 715/834 |
| 6,005,601 A * | 12/1999 | Ohkura et al. | ................. | 725/52 |
| 6,144,378 A * | 11/2000 | Lee | ............................ | 715/767 |
| 6,448,987 B1 * | 9/2002 | Easty et al. | ................. | 715/834 |
| 6,819,344 B1 * | 11/2004 | Robbins | ..................... | 715/848 |
| 6,920,445 B1 * | 7/2005 | Bae | ............................... | 707/2 |
| 2005/0050476 A1 * | 3/2005 | SanGiovanni | ............... | 715/834 |

* cited by examiner

*Primary Examiner*—Ba Huynh
*Assistant Examiner*—Steven B Theriault
(74) *Attorney, Agent, or Firm*—Kory D. Christensen; Stoel Rives LLP

(57) ABSTRACT

A user interface includes a first menu comprising a first set of selectable options circumferentially disposed on the first menu. In response to a selection of an option from the first menu, a second menu is displayed. The second menu may be concentrically-disposed relative to the first menu. The second menu includes a second set of circumferentially-disposed, selectable options, which may or may not be hierarchically related to the first set of selectable options.

43 Claims, 10 Drawing Sheets

CONCENTRIC POLYGONAL MENUS FOR A GRAPHICAL USER INTERFACE

CROSS-REFERENCE TO RELATED APPLICATIONS

This application is a continuation-in-part of U.S. Design Patent Application Ser. No. 29/148,625, filed Sep. 24, 2001, now U.S. Pat. No. D. 474,197, for "User Interface Design for a Television Display Screen", which is incorporated herein by reference in its entirety. This application is related to and claims priority from U.S. Provisional Application Ser. No. 60/329,981, filed Oct. 17, 2001, for "User Interfaces for Interactive Television", which is likewise incorporated by reference in its entirety.

BACKGROUND

1. Field of the Invention

The present invention relates generally to the field of graphical user interface design. More specifically, the present invention relates to a graphical user interface including concentrically-disposed polygonal menus.

2. Description of Related Background Art

Designers of graphical user interfaces have sought to create menus that are easy to use and are capable of presenting a varying number of options in an efficient and visually-interesting manner. Some design considerations have been how to simultaneously display a large number of options, how to treat hierarchically-related menu levels, how to identify user selections, and the like.

One common menu type is the "cascading" menu, which is ubiquitous in the personal computer art (e.g., the Windows® "Start" menu). In general, a cascading menu presents a columnar list of options from which a user may select. Once an option is selected, a second list of options may be displayed, typically to the right of, and below, the first list of options. In response to further selections, additional lists may be displayed that cascade down and to the right of previous lists until a last option level is reached.

Unfortunately, because cascading menus are so common, users do not generally perceive them to be visually interesting or entertaining. Moreover, cascading menus often make poor use of display space. Typically, all of the options are clustered together on the left side of the display, while the right side of the display is comparatively empty. In some cases, options may not be displayed because the menu is too long to fit on the display screen.

Cascading menus can also make it difficult to determine the sequence of selections (i.e. the "selection path") that was taken to the currently-selected option. Trying to identify options that might have been selected may be difficult and/or confusing.

Accordingly, what is needed is a simple and intuitive menu that makes efficient use of display space and is more entertaining and visually interesting than standard cascading menus. What is also needed is a menu that clearly delineates the selection path taken by a user.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
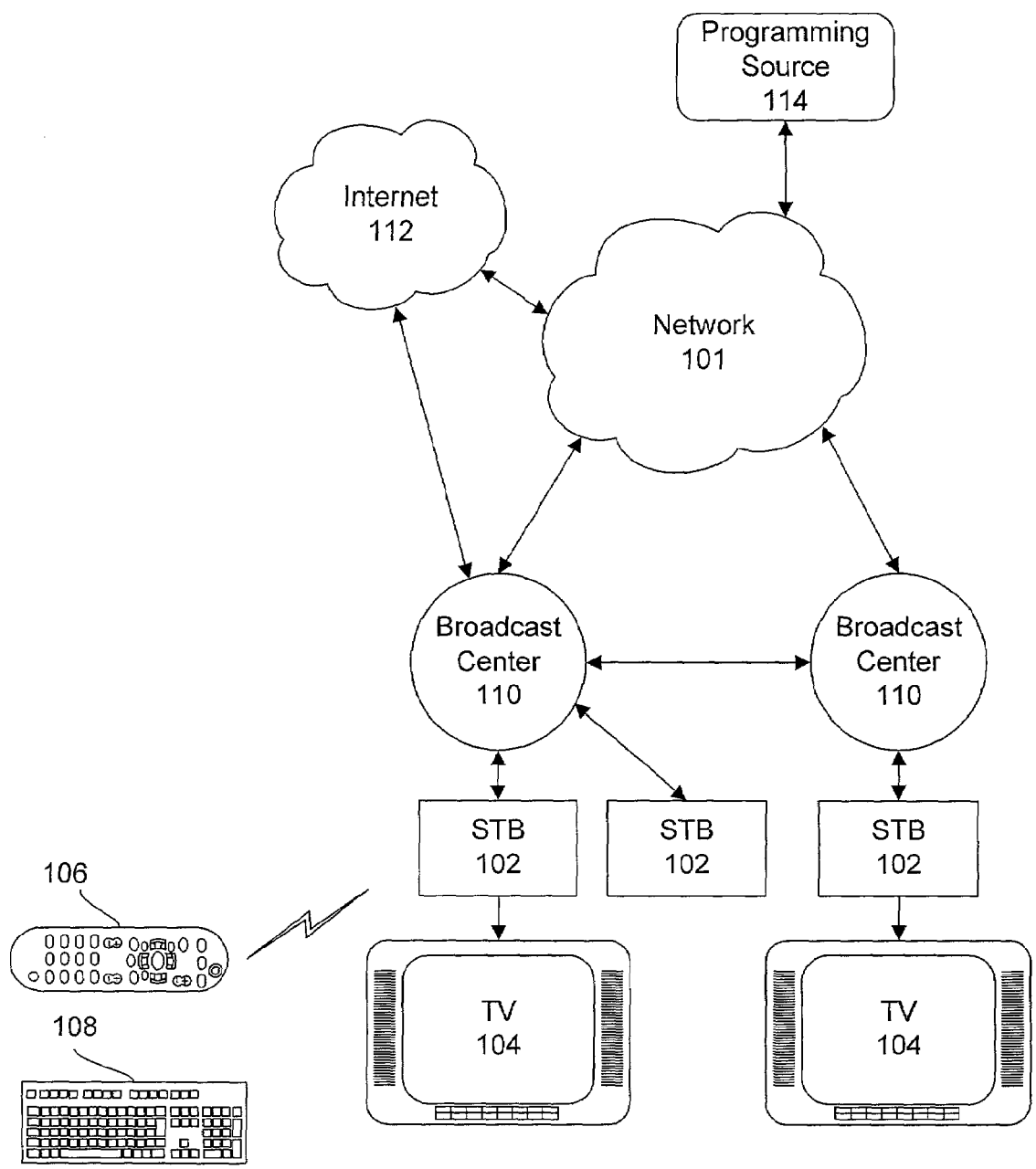
FIG. 1 is a block diagram of a communication system.

The present invention relates to a graphical user interface (GUI) including concentric curvilinear menus that addresses all of the above-identified problems and disadvantages. In one implementation, a first curvilinear menu is displayed on a display screen of a terminal. The terminal may be a personal computer (PC), interactive television (ITV) system, personal digital assistant (PDA), cellular telephone, or other device that provides a GUI.

The curvilinear menu may be generally ring-shaped, although other configurations are possible. In one embodiment, the curvilinear menu may be only partially displayed on the display screen, e.g., a portion of the curvilinear menu may appear to reside off-screen.

The first curvilinear menu may include a first set of user selectable options circumferentially disposed about the first curvilinear menu. The selectable options may include text descriptions, icons, or other suitable indicators.

In one embodiment, a user selects an option from the first set. In response, a second curvilinear menu (or portion thereof) is displayed on the display screen. The second curvilinear menu may include a second set of selectable options circumferentially disposed about the second curvilinear menu.

The second curvilinear menu may be concentrically disposed relative to the first curvilinear menu. For example, the second curvilinear menu may be embodied as a concentric ring disposed within or around the first curvilinear menu.

In response to a selection of an option from the second curvilinear menu, a third curvilinear menu may be concentrically displayed, and so on. Any number of curvilinear menus may be concentrically displayed within the scope of the invention.

In alternative embodiments, the menus may be polygonal rather than curvilinear. Moreover, the first and second menus may employ the same or different types of polygons, e.g., squares, pentagons, octagons, and the like. The number of sides of a polygonal menu may be determined by the number of available options. For instance, menus having three options may be embodied as triangles, menus having five options may be embodied as pentagons, and so on.

In certain embodiments, the first and second sets of selectable options are hierarchically related. For instance, the second set of selectable options may be sub-options corresponding to a selected option from the first menu. Accordingly, the second menu may be termed a "sub-menu." In alternative embodiments, however, the various sets of selectable options may have no defined relationship with each other.

A user selection may be made, in one embodiment, by rotatably aligning an option from one of the curvilinear or polygonal menus with a fixed (stationary) selection indicator, such as an arrow or other suitable indicator. Multiple curvilinear or polygonal menus may be aligned with a single selection indicator.

Alternatively, each curvilinear or polygonal menu may have its own selection indicator. In such an embodiment, a selection may be made by rotatably aligning the selection indicator to an option on a corresponding stationary menu.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring now to FIG. 1, there is shown a communication system 100. In one implementation, the system 100 includes a broadband network 101, such as a cable television network or a direct satellite broadcast (DBS) network, although other networks are possible.

The system 100 may include a plurality of set top boxes (STBs) 102 located, for instance, at customer homes or offices. Generally, an STB 102 is a consumer electronics device that serves as a gateway between a customer's television 104 and the network 101. In alternative embodiments, an STB 102 may be embodied more generally as a personal computer (PC), an advanced television 104 with STB functionality, or another type of customer premises equipment (CPE).

An STB 102 receives encoded television signals and other information from the network 101 and decodes the same for display on the television 104 or other display device, such as a computer monitor. As its name implies, an STB 102 is typically located on top of, or in close proximity to, the television 104.

Each STB 102 may be distinguished from other network components by a unique identifier, number, code, or address, examples of which include an Internet Protocol (IP) address (e.g., an IPv6 address), a Media Access Control (MAC) address, or the like. Thus, video signals and other information may be transmitted from the network 101 to a specific STB 102 by specifying the corresponding address, after which the network 101 routes the transmission to its destination using conventional techniques.

A remote control 106 is provided, in one configuration, for convenient remote operation of the STB 102 and the television 104. The remote control 106 may use infrared (IR), radio frequency (RF), or other wireless technologies to transmit control signals to the STB 102 and the television 104. Other remote control devices are also contemplated, such as wired or wireless mice (not shown).

Additionally, a keyboard 108 (either wireless or wired) is provided, in one embodiment, to allow a user to rapidly enter text information into the STB 102. Such text information may be used for e-mail, instant messaging (e.g. text-based chat), or the like. In various embodiments, the keyboard 108 may use infrared (IR), radio frequency (RF), or other wireless technologies to transmit keystroke data to the STB 102.

Each STB 102 may be coupled to the network 101 via a broadcast center 110. In the context of a cable television network, a broadcast center 110 may be embodied as a "head-end", which is generally a centrally-located facility within a community where television programming is received from a local cable TV satellite downlink or other source and packaged together for transmission to customer homes. In one configuration, a head-end also functions as a Central Office (CO) in the telecommunication industry, routing video signals and other data to and from the various STBs 102 serviced thereby.

A broadcast center 110 may also be embodied as a satellite broadcast center within a direct broadcast satellite (DBS) system. A DBS system may utilize a small 18-inch satellite dish, which is an antenna for receiving a satellite broadcast signal. Each STB 102 may be integrated with a digital integrated receiver/decoder (IRD), which separates each channel, and decompresses and translates the digital signal from the satellite dish to be displayed by the television 104.

Programming for a DBS system may be distributed, for example, by multiple high-power satellites in geosynchronous orbit, each with multiple transponders. Compression (e.g., MPEG) may be used to increase the amount of programming that can be transmitted in the available bandwidth.

The broadcast centers 110 may be used to gather programming content, ensure its digital quality, and uplink the signal to the satellites. Programming may be received by the broadcast centers 110 from content providers (CNN®, ESPN®, HBO®, TBS®, etc.) via satellite, fiber optic cable and/or special digital tape. Satellite-delivered programming is typically immediately digitized, encrypted and uplinked to the orbiting satellites. The satellites retransmit the signal back down to every earth-station, e.g., every compatible DBS system receiver dish at customers' homes and businesses.

Some broadcast programs may be recorded on digital videotape in the broadcast center 110 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 101, the broadcast centers 110 may be coupled directly to one another or through the network 101. In alternative embodiments, broadcast centers 110 may be connected via a separate network, one particular example of which is the Internet 112. The Internet 112 is a "network of networks" and is well known to those skilled in the art. Communication over the Internet 112 is accomplished using standard protocols, such as TCP/IP (Transmission Control Protocol/Internet Protocol) and the like.

A broadcast center 110 may receive television programming for distribution to the STBs 102 from one or more television programming sources 114 coupled to the network 101. Preferably, television programs are distributed in an encoded format, such as MPEG (Moving Picture Experts Group). Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG.

Broadcast centers 110 may be used to enable audio and video communications between STBs 102. Transmission between broadcast centers 110 may occur (i) via a direct peer-to-peer connection between broadcast centers 110, (ii) upstream from a first broadcast center 110 to the network 101 and then downstream to a second broadcast center 110, or (iii) via the Internet 112. For instance, a first STB 102 may send a video transmission upstream to a first broadcast center 110, then to a second broadcast center 110, and finally downstream to a second STB 102.

Of course, the communication system 100 illustrated in FIG. 1 is merely exemplary, and other types of devices and networks may be used within the scope of the invention.

Figure 2:
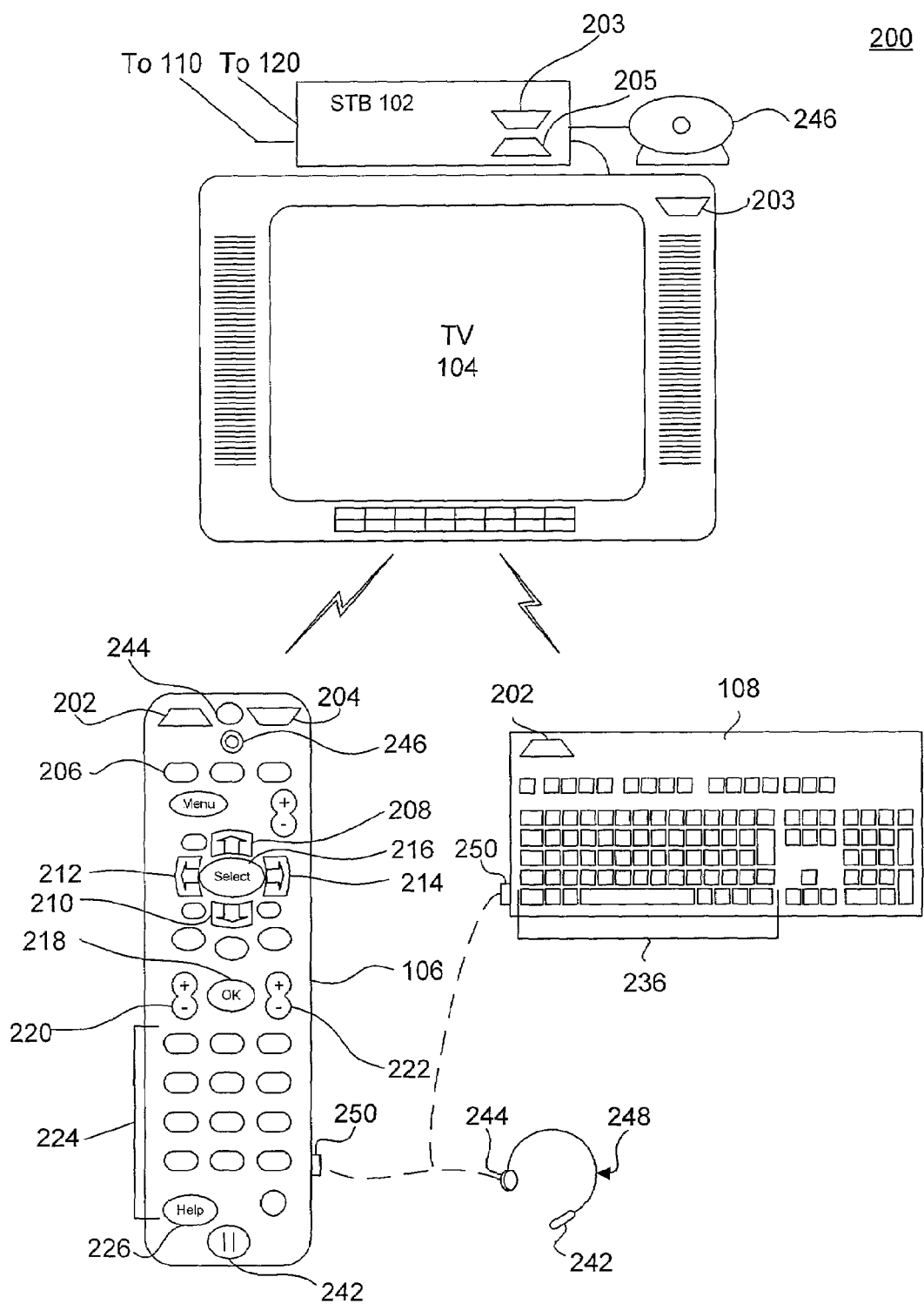
FIG. 2 is an illustration of an interactive television system.

Referring now to FIG. 2, there is shown an interactive television (ITV) system 200 according to an embodiment of the invention. As depicted, the system 200 may include an STB 102, a television 104 (or other display device), a remote control 106, and, in certain configurations, a keyboard 108.

The remote control 106 is provided for convenient remote operation of the STB 102 and the television 104. In one configuration, the remote control 106 includes a wireless transmitter 202 for transmitting control signals (and possibly audio/video data) to a wireless receiver 203 within the STB 102 and/or the television 104. In certain embodiments, the remote control 106 includes a wireless receiver 204 for receiving signals from a wireless transmitter 205 within the STB 102. Operational details regarding the wireless transmitters 202, 205 and wireless receivers 203, 204 are generally well known to those of skill in the art.

The remote control 106 preferably includes a number of buttons or other similar controls. For instance, the remote control 106 may include a power button 206, an up arrow button 208, a down arrow button 210, a left arrow button 212, a right arrow button 214, a "Select" button 216, an "OK" button 218, channel adjustment buttons 220, volume adjustment buttons 222, alphanumeric buttons 224, a "Help" button 226, and the like. In other embodiments the remote control may control a dial to control the user interfaces and other selectable options.

Figure 3:
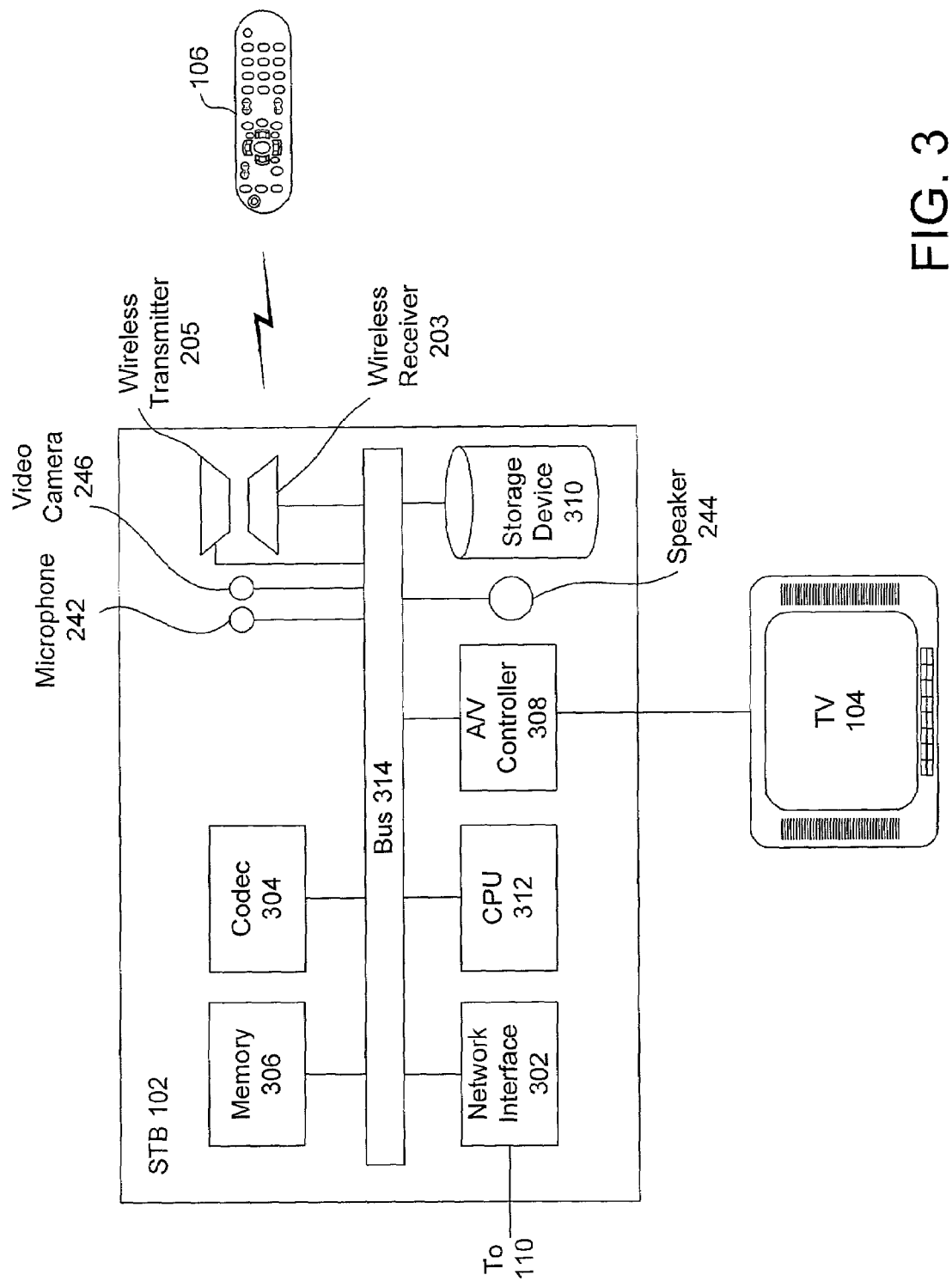
FIG. 3 is a block diagram of physical components of a set top box (STB)

In one embodiment, the remote control 106 includes a microphone 242 for capturing audio signals. The captured audio signals may be transmitted to the STB 102 via the wireless transmitter 202. In addition, the remote control 106 may include a speaker 244 for generating audible output from audio signals received from the STB 102 via the wireless receiver 204. In alternative embodiments, as shown in FIG. 3, the microphone 242 and/or speaker 244 may be integrated with the STB 102.

In certain embodiments, the remote control 106 further includes a video camera 246, such as a CCD (charge-coupled device) digital video camera, for capturing video signals. In one implementation, the video camera 246 is in electrical communication with the wireless transmitter 202 for sending the captured video signals to the STB 102. Like the microphone 242 and speaker 244, the video camera 246 may be integrated with the STB 102, or attached to the STB 102, as in the depicted embodiment.

The various components of the remote control 106 may be positioned in different locations for functionality and ergonomics. For example, as shown in FIG. 2, the speaker 244 may be positioned near the "top" of the remote control 106 (when viewed from the perspective of FIG. 2) and the microphone 242 may be positioned at the "bottom" of the remote control 106. Thus, in one embodiment, a user may conveniently position the speaker 244 near the user's ear and the microphone 242 near the user's mouth in order to operate the remote control 106 in the manner of a telephone.

The optional keyboard 108 facilitates rapid composition of text messages. The keyboard 108 includes a plurality of standard alphanumeric keys 236. In one configuration, the keyboard 108 includes a wireless transmitter (not shown), similar or identical to the wireless transmitter 202 of the remote control 106. The wireless transmitter transmits keystroke data from the keyboard 108 to the STB 102. Additionally, the keyboard 108 may include one or more of the buttons illustrated on the remote control 106.

Alternatively, or in addition, a hands-free headset 248 may be coupled to the remote control 106 or the keyboard 108. The headset 248 may be coupled using a standard headset jack 250. The headset 248 may include a microphone 242 and/or speaker 244. Such a headset 248 may be used to reduce audio interference from the television 104 (improving audio quality) and to provide the convenience of hands-free operation.

Referring now to FIG. 3, there is shown a block diagram of physical components of an STB 102 according to an embodiment of the invention. As noted above, the STB 102 includes a wireless receiver 203 for receiving control signals sent by the wireless transmitter 202 in the remote control 106 and a wireless transmitter 205 for transmitting signals (such as audio/video signals) to the wireless receiver 204 in the remote control 106.

The STB 102 also includes, in one implementation, a network interface 302 for communicating with the network 101 via the broadcast center 110. The interface 302 may include conventional circuitry for receiving, demodulating, and demultiplexing MPEG packets. The interface 302 may also include conventional modem circuitry for sending or receiving data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

The STB 102 also preferably includes a codec (encoder/decoder) 304, which serves to encode audio/video signals into a network-compatible data stream for transmission over the network 101. The codec 304 also serves to decode a network-compatible data stream received from the network 101. The codec 304 may be implemented in hardware and/or software. Moreover, the codec 304 may use various algorithms, such as MPEG or Voice over IP (VoIP), for encoding and decoding.

The STB 102 further includes a memory 306, such as a random access memory (RAM), for storing temporary data. Similarly, a read-only memory (ROM) may be provided for storing more permanent data, such as fixed code and configuration information.

In one embodiment, an audio/video (A/V) controller 308 is provided for converting digital audio/video signals into analog signals for playback/display on the television 104. The A/V controller 308 may be implemented using one or more physical devices, such as separate graphics and sound controllers. The A/V controller 308 may include graphics hardware for performing bit-block transfers (bit-blits) and other graphical operations for displaying a graphical user interface (GUI) on the television 104.

In some implementations, the STB 102 may include a storage device 310, such as a hard disk drive or the like. The storage device 310 may be configured to store encoded incoming and outgoing video signals as well as television broadcasts and retrieve the same at a later time for display. The storage device 310 may be configured, in one embodiment, as a digital video recorder (DVR), enabling scheduled recording of television programs, pausing (buffering) live video, etc. The storage device 310 may also be used in various embodiments to store viewer preferences, parental lock settings, electronic program guide (EPG) data, passwords, e-mail messages, video messages, video greetings, and the like. In one implementation, the storage device 310 also stores an operating system (OS) for the STB 102, such as Windows CE® or Linux®.

As noted above, the STB 102 may include, in certain embodiments, a microphone 242 and a speaker 244 for capturing and reproducing audio signals, respectively. The STB 102 may also include or be coupled to a video camera 246 for capturing video signals. These components may be included in lieu of or in addition to similar components in the remote control 106, keyboard 108, and/or television 104.

A CPU 312 controls the operation of the STB 102, including the other components thereof, which are coupled to the CPU 312 in one embodiment via a bus 314. The CPU 312 may be embodied as a microprocessor, a microcontroller, a digital signal processor (DSP) or other device known in the art. For instance, the CPU 312 may be embodied as an Intel® x86 processor. As noted above, the CPU 312 may perform logical and arithmetic operations based on program code stored within the memory 306 or the storage device 310.

Of course, FIG. 3 illustrates only one possible configuration of an STB 102. Those skilled in the art will recognize that various other architectures and components may be provided within the scope of the invention. In addition, various standard components are not illustrated in order to avoid obscuring aspects of the invention.

Figure 4:
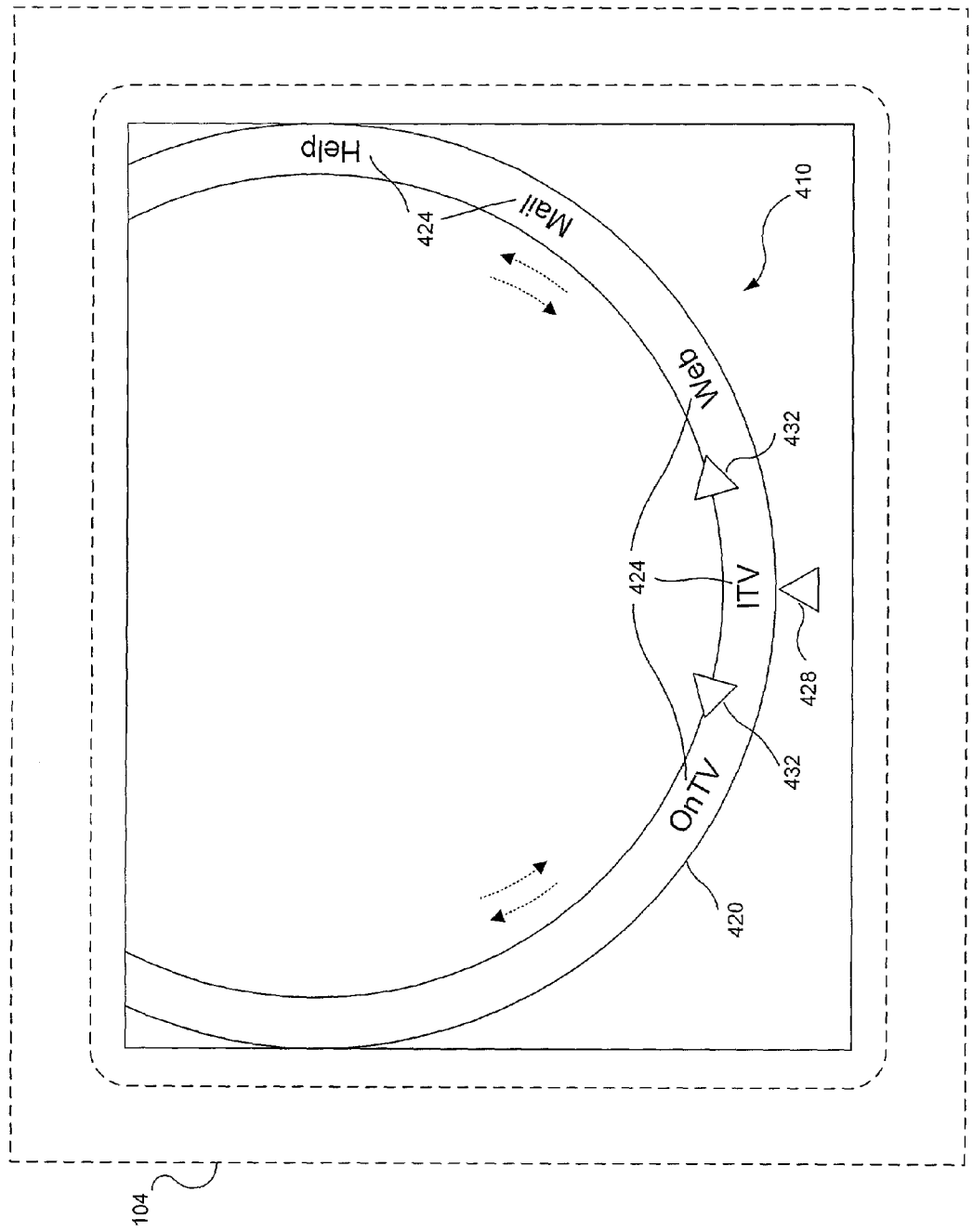
FIGS. 4–6 illustrate various embodiments of a curvilinear menu.

FIG. 4 illustrates a graphical user interface (GUI) 410 in accordance with an embodiment of the invention. As depicted, the GUI 410 may be displayed on a television 104 (shown in dashed lines) or other display device, such as computer monitor.

In one implementation, the GUI 410 includes a first curvilinear menu 420. The menu 420 may be generally ring-shaped, although other curvilinear shapes (e.g., elliptical, parabolic) are possible within the scope of the invention. Moreover, the entire curvilinear shape of the menu 420 need not be displayed, as illustrated in FIG. 4. For instance, a portion of the menu 420 may appear to reside off-screen.

The menu 420 includes a first set of selectable options 424 corresponding to various functions or options within an STB 102, personal computer, PDA, cellular telephone, or the like. As illustrated, the options 242 may correspond to top-level functions within an ITV system 200, e.g., "OnTV", "ITV", "Web", "Mail", "Help", etc. However, a wide variety of other functions or options may be provided within the scope of the invention.

The displayed options 424 may comprise text descriptions, as shown in FIG. 4. However, in alternative embodiments, the options 424 may be represented by icons, images, or any combination of text and graphics.

As illustrated, the displayed options 424 may be circumferentially disposed about the first curvilinear menu 420. As used herein, "circumferentially" refers to positions on or near the border or perimeter of the menu 420. The options 424 may be spaced at regular intervals on the menu 420, although many other arrangements are possible.

Every available option 424 need not be displayed on the menu 420. Indeed, there may exist many more options 424 than may be conveniently displayed at the same time on the menu 420. Accordingly, as shown in FIG. 4, a portion of the menu 420 may extend off of the display screen. This off-screen portion may conceal any number of options 424.

A user may select one of the options 424 from the menu 420 in various ways. In one implementation, the menu 420 (including the options 242) may be rotated under user control to align a desired option 424 with a stationary selection indicator 428. The indicator 428 may be embodied as an arrow, triangle, pointer, window, highlighted area, location (e.g., the lowest point of the menu 420), or the like. In alternative embodiments, the menu 420 (e.g., the graphical elements comprising the menu 420) may not actually rotate. Rather, the options 424 may move in such a manner that the menu 420 appears to rotate.

The user may control the rotation of the menu 420 using various input devices, such as a keyboard 108, mouse, or remote control 106. The menu 420 may rotate clockwise or counterclockwise around an axis that may or may not be located within the displayable area of the GUI 410.

Once a desired option 424 is aligned with the selection indicator 428, a user may indicate his or her selection of the option 424 in any suitable manner, such as by pressing the "Select" button 216 on the remote control 106, pressing a particular key on the keyboard 108, or the like.

In one embodiment, rotation indicators 432 may be provided to indicate possible direction(s) of rotation for the menu 420. In certain embodiments, the rotation indicators 432 may be animated, change color, etc., during menu rotation. Alternatively, or in addition, the rotation indicators 432 may be user-selectable controls (e.g., via the remote control 106) that initiate rotation in the desired direction.

In yet another embodiment, an option 424 is selected by moving the selection indicator 428 around a stationary menu 420. The user may control the clockwise and counterclockwise movements of the selection indicator 428 in the same manner as the rotation of the menu 420. Once the selection indicator 428 is aligned with a desired option 424, the user may indicate selection of the option 424 through any of the methods described above.

In certain implementations, each option 424 may be associated with an audio sample, which is played when the option 424 is aligned with the selection indicator 428. The audio sample may include a digitized verbal description of the option 424, and may be used to assist those with vision problems or those with difficulty reading.

Figure 5:
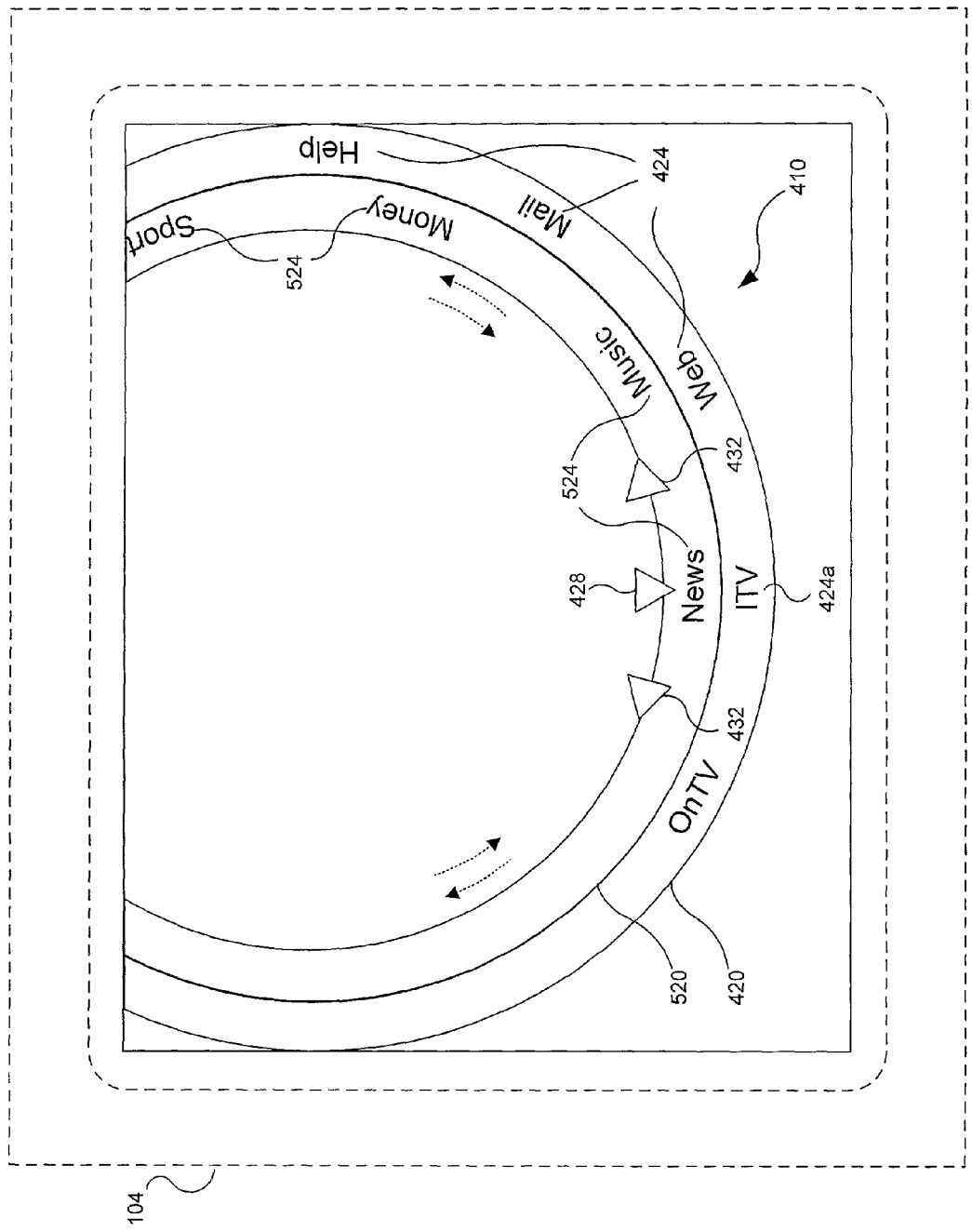

Referring now to FIG. 5, in response to an option 424 being selected from the first menu 420, a second curvilinear menu 520 may be displayed in the GUI 410. The second menu 520 may include a second set of selectable options 524 circumferentially disposed about the menu 520. As depicted, the menu 520 may be ring-shaped, although the invention is not limited in this respect.

In the embodiment illustrated in FIG. 5, the second menu 520 is concentrically disposed within the first menu 420. Alternatively, the second menu 520 may be concentrically disposed around the first menu 420.

In certain configurations, the first and second sets of selectable options 424, 524 may be hierarchically related.

For instance, the second set of selectable options 524 may be sub-options corresponding to a selected option 424 from the first menu 420. Accordingly, the second menu 520 may be termed a sub-menu of the first menu 420.

For example, as shown in FIG. 5, a user may select the "ITV" option 424a from the first menu 420. In response, a sub-menu 520 is displayed including various sub-options 524 (e.g., "News", "Music", "Money", "Sports") corresponding to the selected option 424a from the first menu 420.

In alternative embodiments, the various sets of options 424, 524 may not be hierarchically related. For example, a user may be required to make a series of choices, each of which is independent of a previous or next choice. An example of such an embodiment may include a "setup" menu in which each menu level corresponds to independent settings for an STB 102.

As before, a user may select an option 524 from the menu 520. In one implementation, the menu 520 may be rotated to align the selected option 524 with the selection indicator 428 described above. As illustrated, the selection indicator 428 and/or the rotation indicators 432 may move from a position near the first menu 420 to a location closer to the second menu 520 to indicate that the second menu 520 is currently active and may be rotated. The active menu may be indicated in other ways, however, such as by changing its color, enlarging it, etc. As previously noted, the user may indicate a selection of the aligned option 524 using any suitable technique, such as pressing a "Select" button 216 on the remote control 106.

In alternative embodiments, the user may move (rotate) the selection indicator 428, rather than the menu 520, to align the indicator 428 with the desired option 524. In such an embodiment, a new selection indicator 428 may be displayed for the second menu 520 (and for each subsequent menu). This allows the user to easy observe the selection path to the currently selected option.

Figure 6:
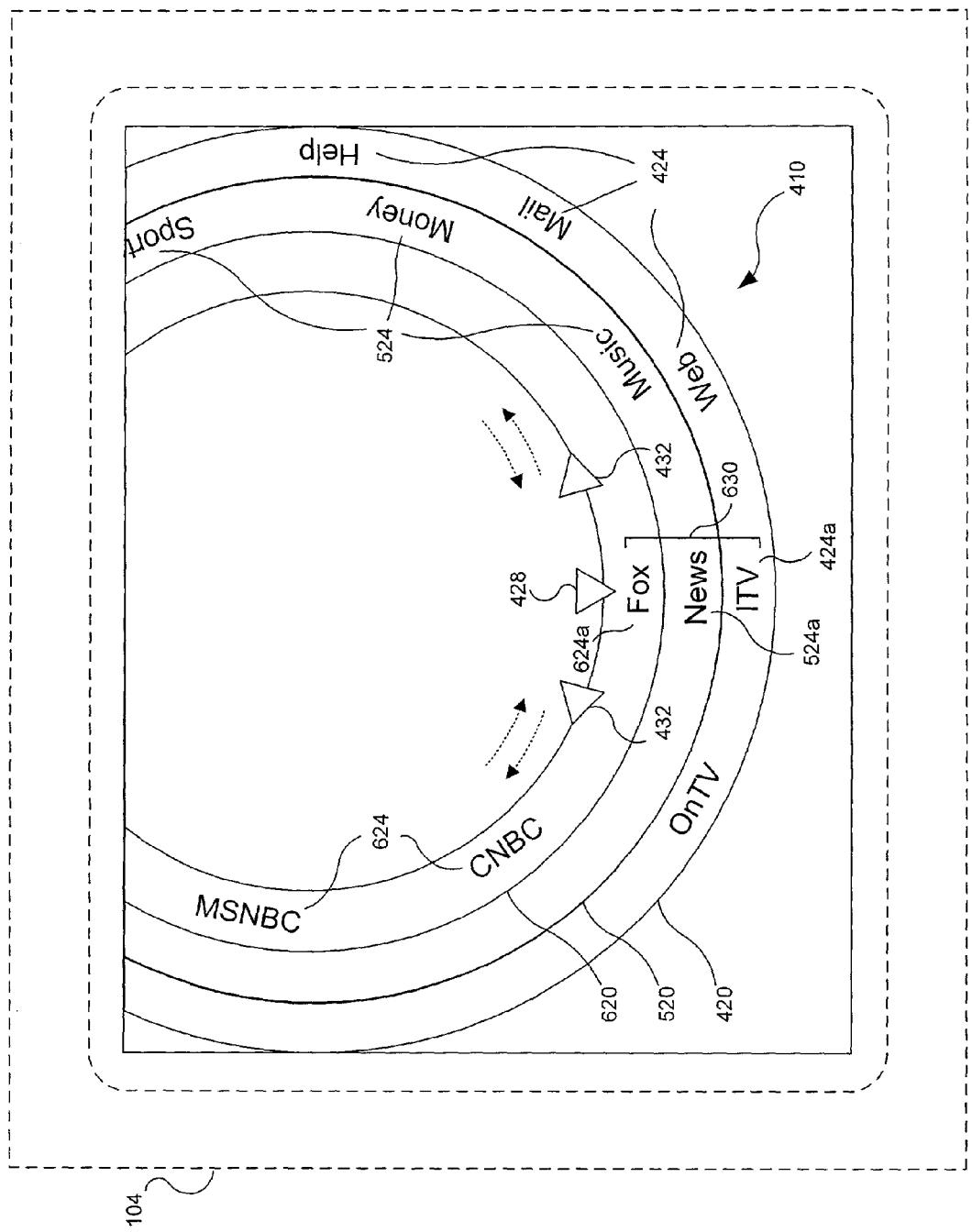

As previously noted, any number of menus may be displayed within the scope of the invention. For example, as shown in FIG. 6, a third curvilinear menu 620 may be displayed in response to a selection of an option 524a from the second menu 520. As before, the third menu 620 may be concentrically disposed with respect to the second menu 520. Moreover, the third menu 620 may include a third set of selectable options 624, which may or may not be hierarchically related to the second set of selectable options 524.

As shown in FIG. 6, a user may easily observe the selection path 630 taken to the currently-selected option 624a, since each of the options 424a, 524a, 624a may be aligned with a stationary selection indicator 428. However, in alternative embodiments, multiple movable selection indicators 428 (not shown) may be provided, which may similarly be used to determine the selection path 630.

Various visual effects may be applied to the menus 420, 520, 620 as they appear. For instance, each menu 420, 520, 620 may "roll" onto the GUI 410 from some off-screen location. Alternatively, menus 420, 520, 620 may "fade" in or out as necessary. Such effects may increase the visual appeal and entertainment value of the GUI 410.

In certain configurations, each of the menus 420, 520, 620 may be displayed from the outset, while one of the menus (e.g., menu 420) may be initially active. A user may make a selection from the first menu 420, after which the second menu 520 becomes active, and so on. Additionally, a control may be provided for switching between menus 420, 520, 620 without actually making a selection. Accordingly, a user may initially see most or all of the options 424, 524, 624 available in the GUI 410.

In one embodiment, users may customize these menus 420, 520, 620 to accommodate their viewing preferences. Customizations may include, but are not limited to, adding and deleting menus and menu options. For instance, the user may remove the "Sports" option 524 from the menu 520. Alternatively, the user may create another concentric menu that only shows preferred sports channels. A variety of other customizations may be performed that are considered to be within the scope of the invention.

Figure 7:
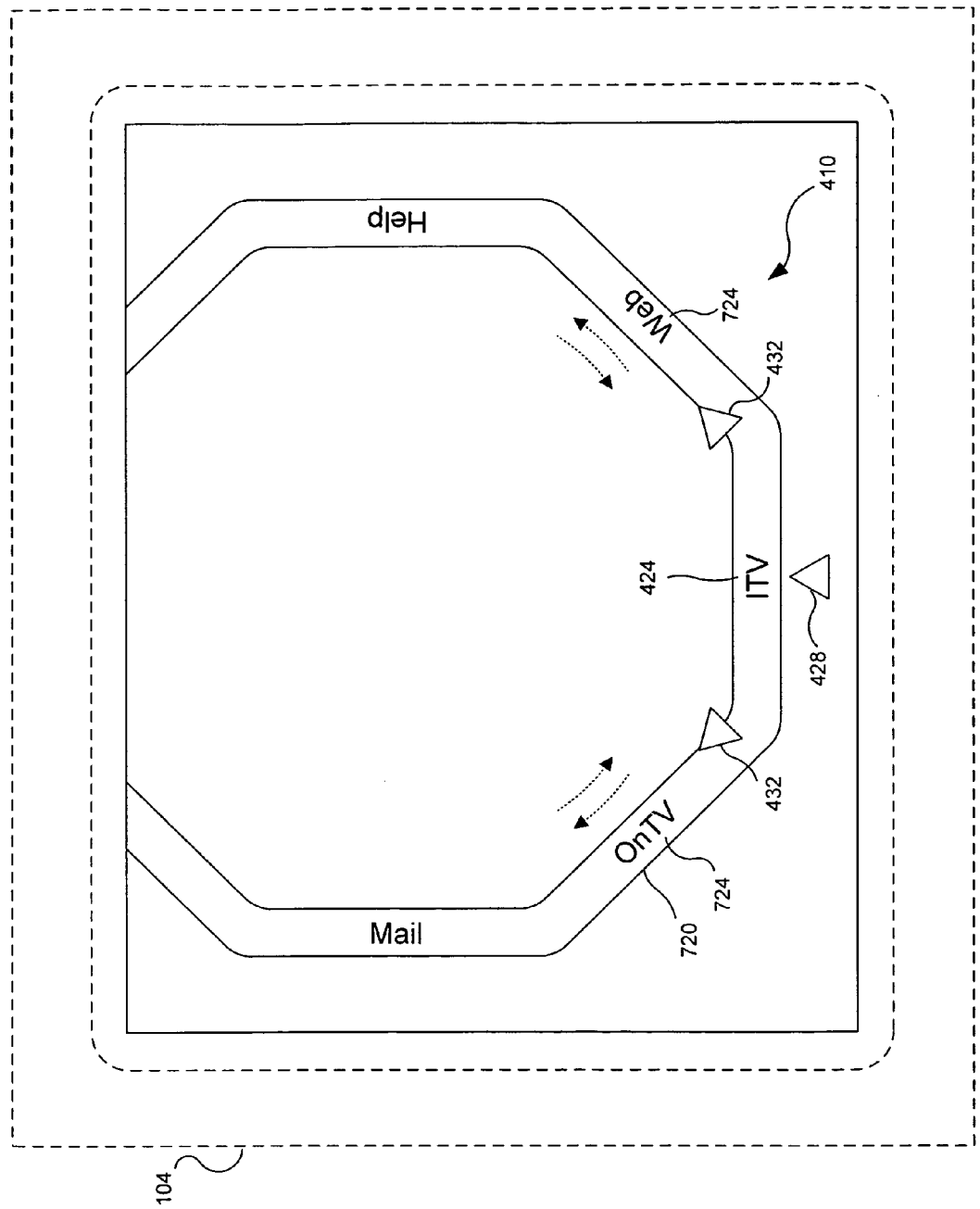
FIGS. 7–9 illustrate various embodiments of a polygonal menu.

As previously noted, the menus need not be curvilinear. For example, as shown in FIG. 7, a first polygonal menu 720 with any number of sides may be displayed on the television 104 or other display device. In the depicted embodiment, the menu 720 is octagonal, although the invention is by no means limited in this respect.

The menu 720 may include a number of selectable options 724 disposed circumferentially about the menu 720. In certain embodiments, each side of the menu 720 may be associated with a single option 724. However, in alternative configurations, multiple options 724 may be associated with a side.

A user may select one of the options 724 using any of the techniques described above. For example, the user may rotate the menu 720 about an axis to align a desired option 724 with a selection indicator 428. Again, rotation indicators 432 may be provided to indicate possible direction(s) of rotation or to actually control rotation.

In other embodiments, the menu 720 may be stationary and the selection indicator 428 may move. In such a configuration, multiple selection indicators 428 may be provided, one for each menu level.

Figure 8:
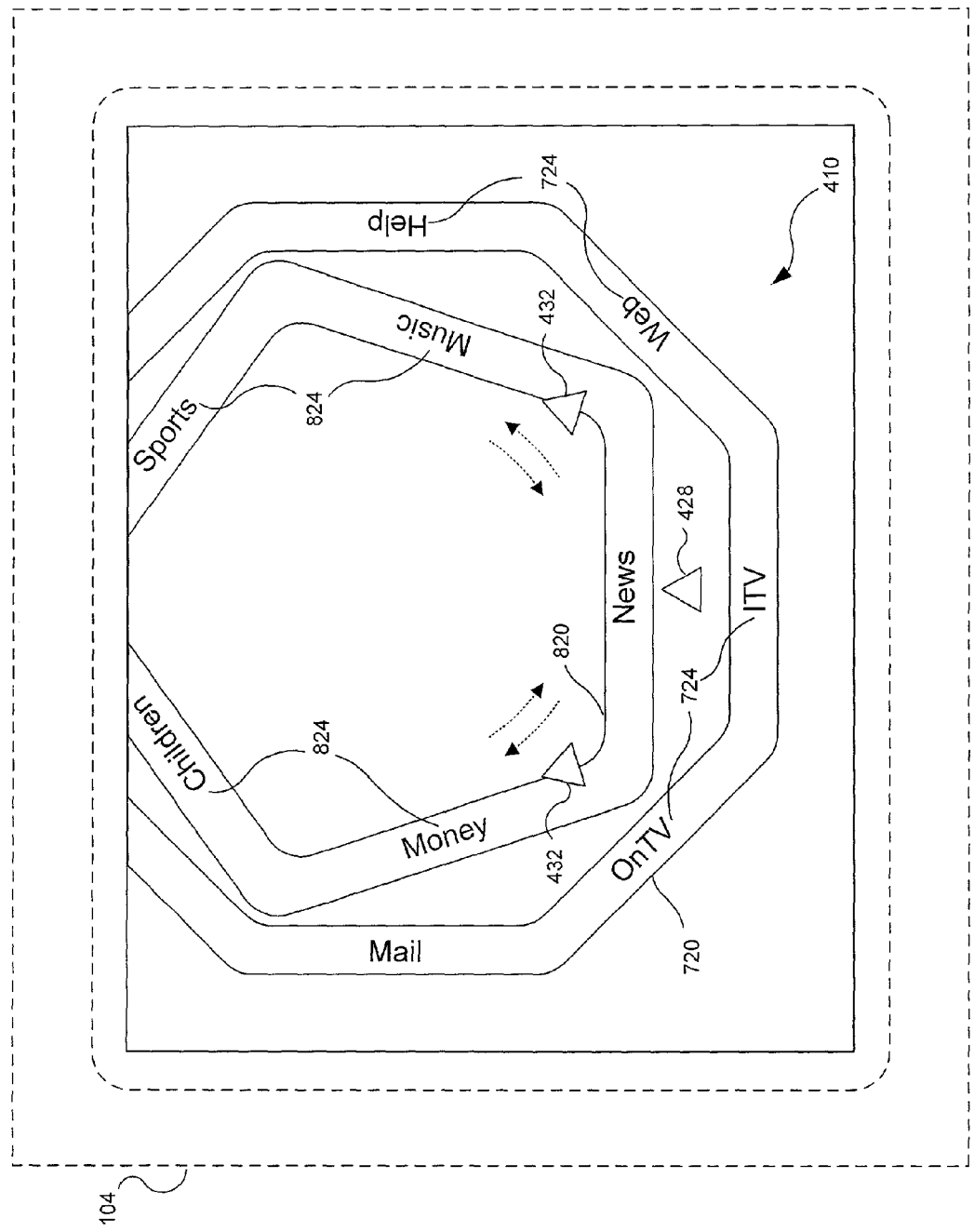

As before, selection of an option 724 from the first menu 720 may result in a second polygonal menu 820 being displayed, as illustrated in FIG. 8. The second polygonal menu 820 need not have the same number of sides. For example, as shown in FIG. 8, the second menu 820 may be a pentagon, while the first menu 720 may be an octagon. The number of sides may be dictated, in certain embodiments, by the number of available options 724, 824 for the particular menu 720, 820.

As in the case of the curvilinear menus 420, 520, 620, the second polygonal menu 820 may be concentrically disposed relative to the first polygonal menu 720. As used herein, "concentric" may mean that the menus share common centers or centroids.

Figure 9:
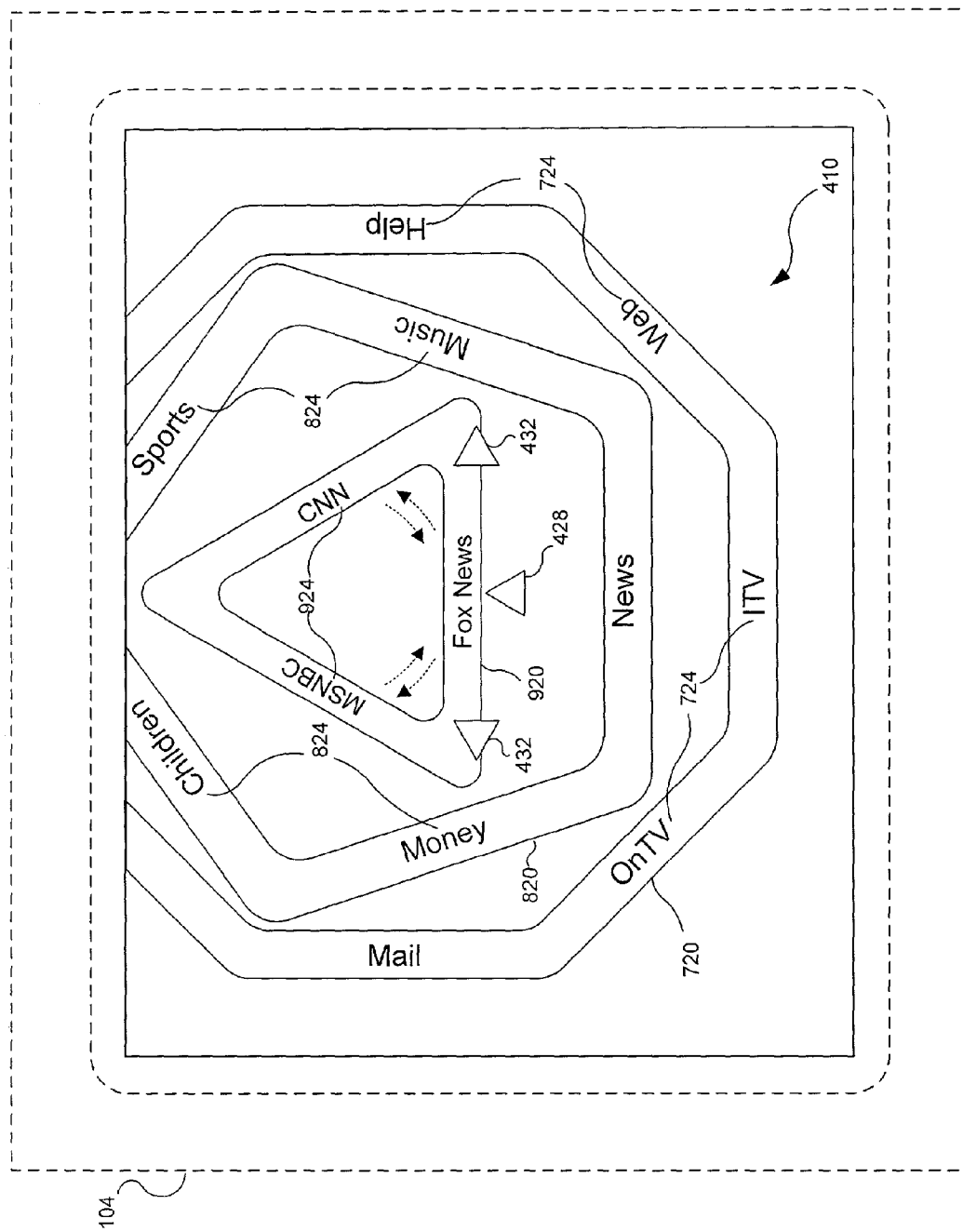

An option 824 from the second menu 820 may be selected using the above-described techniques, resulting in a third polygonal menu 920 being displayed, as shown in FIG. 9. The third polygonal menu 920 may have the same or a different number of sides as the first and second menus 720, 820. In the depicted embodiment, the third menu 920 has three sides, while the first and second menus 720, 820 have eight and five sides, respectively.

In still other embodiments, polygonal and curvilinear menus may be combined within the same GUI 410. In such configurations, polygonal menus may be concentrically disposed within or around one or more curvilinear menus.

Figure 10:
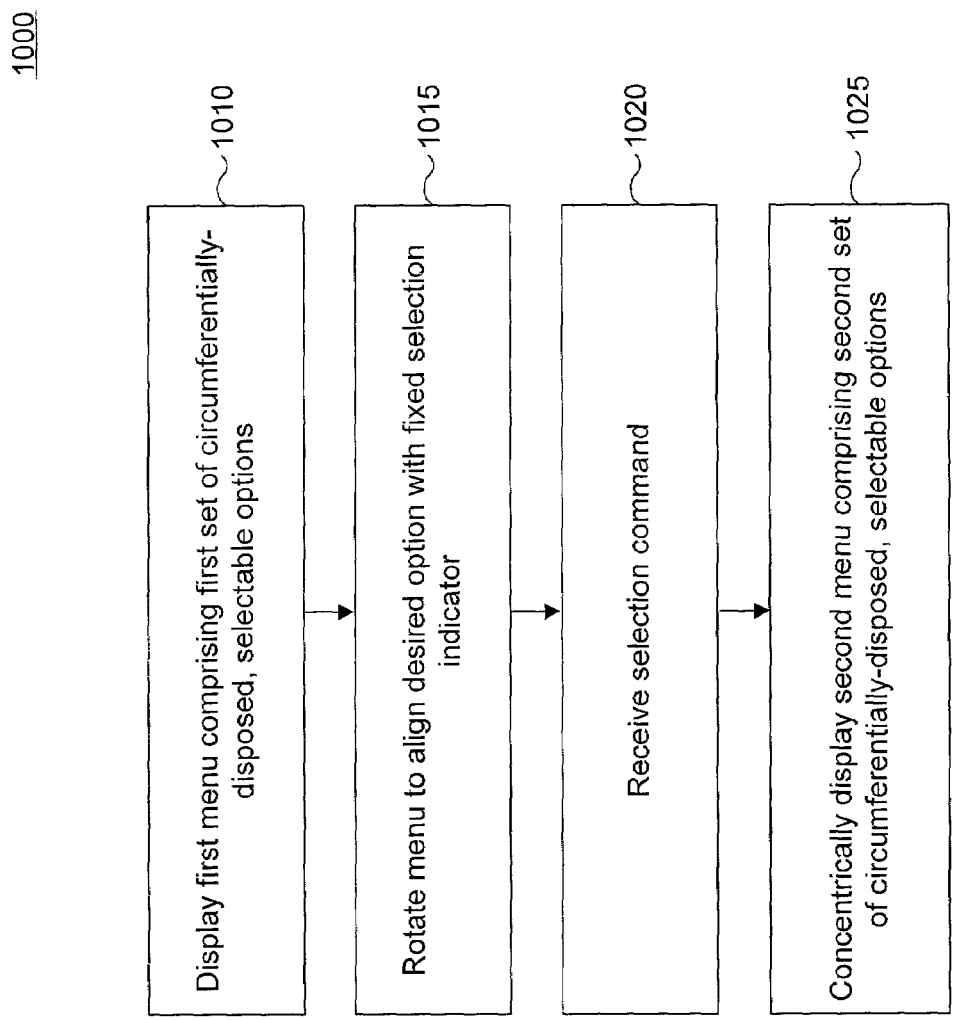
FIG. 10 is a flowchart of a method in accordance with an embodiment of the invention.

Referring now to FIG. 10, there is shown a flowchart of a method 1000 for obtaining input within a GUI 410. The method 1000 begins by displaying 1010 a first menu 420 comprising a first set of selectable options 424 circumferentially disposed on the first menu 420. Thereafter, the menu 420 is rotated 1015 under user control to align a desired option 424 with a fixed selection indicator 428. A selection command is then received 1020 from a user, after which a second menu 520 is concentrically displayed 1025 within or around the first menu 420. The second menu 520 includes a second set of circumferentially-disposed, selectable options 524, which may or may not be hierarchically related to the first set of selectable options 424.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

The invention claimed is:

1. A method for obtaining user input in a graphical user interface, the method comprising:
   displaying at least a portion of a first polygonal menu comprising a first set of selectable options circumferentially disposed on the first polygonal menu;
   receiving a user selection of an option from the first set of selectable options;
   displaying at least a portion of a second polygonal menu comprising a second set of selectable options circumferentially disposed on the second polygonal menu, wherein the second polygonal menu is concentrically-disposed relative to the first polygonal menu; and
   receiving a user selection of an option from the second set of selectable options, wherein the user-selected options from the first and second sets always define a radially-aligned selection path through the first and second polygonal menus.

2. The method of claim 1, further comprising:
   displaying at least a portion of a third polygonal menu comprising a third set of selectable options circumferentially disposed on the third polygonal menu, wherein the third polygonal menu is concentrically-disposed relative to the first and second polygonal menus.

3. The method of claim 1, wherein each side of the first polygonal menu is associated with a particular selectable option, and wherein the number of selectable options in the first set determines the number of sides for the first polygonal menu.

4. The method of claim 1, wherein receiving comprises:
   rotating the first polygonal menu about an axis to align a desired option from the first set with a fixed selection indicator.

5. The method of claim 3, wherein receiving further comprises:
   detecting a user action indicating selection of the option aligned with the selection indicator.

6. The method of claim 1, wherein receiving comprises:
   moving a selection indicator circumferentially around the first polygonal menu to align the selection indicator with a desired option from the first set.

7. The method of claim 6, wherein receiving further comprises:
   detecting a user action indicating selection of the option aligned with the selection indicator.

8. The method of claim 1, wherein the selectable options from the second set are determined by a selected option from the first set.

9. The method of claim 1, wherein the selectable options from the second set are sub-options of a selected option from the first set.

10. The method of claim 1, wherein the selectable options from the first and second sets are hierarchically related.

11. The method of claim 1, wherein at least one selectable option comprises an icon.

12. The method of claim 1, wherein at least one selectable option comprises text description.

13. The method of claim 1, wherein at least one selectable option is associated with an audio sample, and wherein the audio sample is automatically played in response to the corresponding option being aligned with a selection indicator without an explicit selection action other than rotating one of the polygonal menus.

14. The method of claim 1, wherein the second polygonal menu is displayed in response to a selection from the first polygonal menu, and wherein the second polygonal menu concentrically encloses the first polygonal menu.

15. The method of claim 1, wherein the second polygonal menu is displayed in response to a selection from the first polygonal menu, and wherein the second polygonal menu is concentrically enclosed by the first polygonal menu.

16. The method of claim 2, wherein receiving a user selection of an option from the second set comprises:
   rotating the second polygonal menu about an axis to align a desired option from the second set with a fixed selection indicator.

17. The method of claim 2, wherein receiving a user selection of an option from the second set comprises:
   moving a selection indicator circumferentially around the second polygonal menu to align the selection indicator with a desired option from the second set.

18. The method of claim 1, wherein the first and second polygonal menus are rotatable about a common axis in response to a user command.

19. The method of claim 1, wherein the second polygonal menu is displayed in response to the selection of an option from the first set.

20. The method of claim 1, wherein the first polygonal menu is only partially displayed in the graphical user interface, and wherein the first set of selectable options comprises a subset of available options associated with the first polygonal menu.

21. The method of claim 20, wherein the first polygonal menu is rotatable in response to a user command to display a different subset of available options.

22. A user interface comprising:
   a first polygonal menu comprising a first set of selectable options circumferentially disposed on the first polygonal menu; and
   a second polygonal menu comprising a second set of selectable options circumferentially disposed on the second polygonal menu, wherein the second polygonal menu is concentrically-disposed relative to the first polygonal menu, wherein the second polygonal menu is displayed in response to a user selection of an option from the first set, and wherein the user-selected option from the first set and a user-selected option from the second set always define a radially-aligned selection path through the first and second polygonal menus.

23. The user interface of claim 22, further comprising:
   a third polygonal menu comprising a third set of selectable options circumferentially disposed on the third polygonal menu, wherein the third polygonal menu is concentrically-disposed relative to the second polygonal menu, and wherein the third polygonal menu is displayed in response to a user selection of an option from the second set.

24. The user interface of claim 22, wherein the first and second polygonal menus are ring-shaped.

25. The user interface of claim 22, further comprising:
a fixed selection indicator;
wherein the first polygonal menu is rotatable to align a desired option from the first set of selectable options with the fixed selection indicator.

26. The user interface of claim 25, wherein the second polygonal menu is rotatable to align a desired option from the second set with the fixed selection indicator.

27. The user interface of claim 22, further comprising:
a first movable selection indicator configured to move circumferentially around the first polygonal menu to align with a desired option from the first set.

28. The user interface of claim 27, further comprising:
a second movable selection indicator configured to move circumferentially around the second polygonal menu to align to a desired option from the second set.

29. The user interface of claim 22, wherein the selectable options from the second set are determined by a selected option from the first set.

30. The user interface of claim 22, wherein the selectable options from the second set are sub-options of a selected option from the first set.

31. The user interface of claim 22, wherein the selectable options from the first and second sets are hierarchically related.

32. The user interface of claim 22, wherein at least one selectable option comprises an icon.

33. The user interface of claim 22, wherein at least one selectable option comprises text description.

34. The user interface of claim 22, wherein at least one selectable option is associated with an audio sample, and wherein the audio sample is automatically played in response to the corresponding option being aligned with a selection indicator without an explicit selection action other than rotating one of the polygonal menus.

35. The user interface of claim 22, wherein the second polygonal menu is displayed in response to a selection from the first polygonal menu, and wherein the second polygonal menu concentrically encloses the first polygonal menu.

36. The user interface of claim 22, wherein the second polygonal menu is displayed in response to a selection from the first polygonal menu, and wherein the second polygonal menu is concentrically enclosed by the first polygonal menu.

37. The user interface of claim 22, wherein the first and second polygonal menus are rotatable about a common axis in response to a user command.

38. The user interface of claim 22, wherein the first polygonal menu is only partially displayed, and wherein the first set of selectable options comprises a subset of available options associated with the first polygonal menu.

39. The user interface of claim 22, wherein the first polygonal menu is rotatable in response to a user command to display a different subset of available options.

40. A computer program product comprising a computer-readable medium including code for causing a computer to perform a method for obtaining user input in a graphical user interface, the method comprising:
displaying at least a portion of a first polygonal menu comprising a first set of selectable options circumferentially disposed on the first polygonal menu;
receiving a user selection of an option from the first set of selectable options;
displaying at least a portion of a second polygonal menu comprising a second set of selectable options circumferentially disposed on the second polygonal menu, wherein the second polygonal menu is concentrically-disposed relative to the first polygonal menu; and
receiving a user selection of an option from the second set of selectable options, wherein the user-selected options from the first and second sets always define a radially-aligned selection path through the first and second polygonal menus.

41. A system for obtaining user input in a graphical user interface, the system comprising:
means for displaying at least a portion of a first polygonal menu comprising a first set of selectable options circumferentially disposed on the first polygonal menu;
means for receiving a user selection of an option from the first set of selectable options;
means for displaying at least a portion of a second polygonal menu comprising a second set of selectable options circumferentially disposed on the second polygonal menu, wherein the second polygonal menu is concentrically-disposed relative to the first polygonal menu; and
means receiving a user selection of an option from the second set of selectable options, wherein the user-selected options from the first and second sets always define a radially-aligned selection path through the first and second polygonal menus.

42. A method for obtaining user input in a graphical user interface, the method comprising:
displaying at least a portion of a first polygonal menu comprising a first set of selectable options circumferentially disposed on the first polygonal menu;
rotating the first polygonal menu about an axis to radially align an option from the first set with a fixed selection indicator;
in response to a selection of the radially-aligned option from the first set, displaying at least a portion of a second polygonal menu comprising a second set of selectable options circumferentially disposed on the second polygonal menu, wherein the second polygonal menu is concentrically-disposed relative to the first polygonal menu; and
rotating the second polygonal menu about the axis to radially align a user-selected option from the second set with the fixed selection indicator, wherein the user-selected options from the first and second sets always define a radially-aligned selection path through the first and second polygonal menus.

43. The method of claim 42, further comprising:
in response to a selection of the radially-aligned option from the second set, displaying at least a portion of a third polygonal menu comprising a third set of selectable options circumferentially disposed on the third polygonal menu, wherein the third polygonal menu is concentrically-disposed relative to the first and second polygonal menus; and
rotating the third polygonal menu about the axis to radially align a user-selected option from the third set with the fixed selection indicator, wherein the user-selected options from the first, second, and third sets always define a radially-aligned selection path through the first and second polygonal menus.

* * * * *